US012007850B2

(12) United States Patent
Yadav et al.

(10) Patent No.: US 12,007,850 B2
(45) Date of Patent: Jun. 11, 2024

(54) METHOD AND SYSTEM FOR GENERATING BACKUP OF A LARGE FILE AND OPTIMIZING RESOURCE UTILIZATION

(71) Applicant: Dell Products L.P., Round Rock, TX (US)

(72) Inventors: Sunil Yadav, Bangalore (IN); Shelesh Chopra, Bangalore (IN); Aaditya Rakesh Bansal, Bagalore (IN); Manish Sharma, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 119 days.

(21) Appl. No.: 17/687,333

(22) Filed: Mar. 4, 2022

(65) Prior Publication Data
US 2023/0281085 A1 Sep. 7, 2023

(51) Int. Cl.
*G06F 11/14* (2006.01)

(52) U.S. Cl.
CPC ...... *G06F 11/1464* (2013.01); *G06F 11/1435* (2013.01); *G06F 11/1451* (2013.01); *G06F 11/1469* (2013.01); *G06F 2201/84* (2013.01)

(58) Field of Classification Search
CPC .. G06F 11/14; G06F 11/1464; G06F 11/1435; G06F 11/1451; G06F 11/1469; G06F 2201/84
See application file for complete search history.

(56) References Cited

U.S. PATENT DOCUMENTS

| | | | | |
|---|---|---|---|---|
| 10,474,539 | B1* | 11/2019 | Yadav | G06F 11/1464 |
| 2003/0126247 | A1* | 7/2003 | Strasser | G06F 11/1458 |
| | | | | 707/999.2 |
| 2006/0167922 | A1* | 7/2006 | Poyourow | G06F 16/2219 |
| | | | | 707/999.102 |
| 2006/0268792 | A1* | 11/2006 | Belcea | H04W 8/04 |
| | | | | 370/338 |
| 2012/0110005 | A1* | 5/2012 | Kuo | H04L 67/5682 |
| | | | | 707/769 |
| 2012/0233522 | A1* | 9/2012 | Barton | G06F 11/1004 |
| | | | | 707/E17.014 |
| 2015/0106312 | A1* | 4/2015 | Chen | H04W 4/029 |
| | | | | 706/21 |
| 2020/0310921 | A1* | 10/2020 | Littlefield | G06F 16/1834 |
| 2020/0394230 | A1* | 12/2020 | Urankar | G06F 12/0802 |
| 2021/0064486 | A1* | 3/2021 | Rana | G06F 11/1484 |

\* cited by examiner

*Primary Examiner* — Kamini B Patel
(74) *Attorney, Agent, or Firm* — Chamberlain, Hrdlicka, White, Williams & Aughtry; Aly Z. Dossa

(57) ABSTRACT

A method for performing data backup includes: receiving a backup request specifying a file where the file is stored in a shared storage. Additionally, in response to the backup request: retrieving, by a primary data node, properties of the file; determining, by the primary data node, resource availability for plurality of secondary data nodes where the primary data node and the plurality of secondary data nodes is operatively connected to the shared storage and a backup storage; logically dividing, by the primary data node, the file into a plurality of segments using at least the properties of the file; and coordinating, by the primary data node, the backup of the file using the plurality of segments and the resource availability of the plurality of secondary data nodes.

10 Claims, 7 Drawing Sheets

METHOD AND SYSTEM FOR GENERATING BACKUP OF A LARGE FILE AND OPTIMIZING RESOURCE UTILIZATION

BACKGROUND

Computing devices may provide services. To provide the services, the computing devices may include hardware components and software components. Data may be generated by the computing devices during the performance of the services. The data may be important to users. To protect the data, backups of the data may be generated and stored in storage devices. The storage devices may be shared amongst other computing devices.

SUMMARY

In general, certain embodiments described herein relate to a method for performing data backup process for data stored in a shared storage. The method may include receiving a backup request specifying a file, wherein the file is stored in a shared storage; in response to the backup request: retrieving, by a primary data node, properties of the file; determining, by the primary data node, resource availability for plurality of secondary data nodes, wherein the primary data node and the plurality of secondary data nodes is operatively connected to the shared storage and a backup storage; logically dividing, by the primary data node, the file into a plurality of segments using at least the properties of the file; and coordinating, by the primary data node, the backup of the file using the plurality of segments and the resource availability of the plurality of secondary data nodes.

In general, certain embodiments described herein relate to a system for performing data backup process for data stored in a shared storage. The system may include a shared storage and a primary data node that is programmed to receive a backup request specifying a file, wherein the file is stored in a shared storage; in response to the backup request: retrieve, by a primary data node, properties of the file; determine, by the primary data node, resource availability for plurality of secondary data nodes, wherein the primary data node and the plurality of secondary data nodes is operatively connected to the shared storage and a backup storage; logically divide, by the primary data node, the file into a plurality of segments using at least the properties of the file; and coordinate, by the primary data node, the backup of the file using the plurality of segments and the resource availability of the plurality of secondary data nodes.

In general, certain embodiments described herein relate to a non-transitory computer readable medium that includes computer readable program code, which when executed by a computer processor enables the computer processor to perform a method for performing data backup process for data stored in a shared storage. The method may include receiving a backup request specifying a file, wherein the file is stored in a shared storage; in response to the backup request: retrieving, by a primary data node, properties of the file; determining, by the primary data node, resource availability for plurality of secondary data nodes, wherein the primary data node and the plurality of secondary data nodes is operatively connected to the shared storage and a backup storage; logically dividing, by the primary data node, the file into a plurality of segments using at least the properties of the file; and coordinating, by the primary data node, the backup of the file using the plurality of segments and the resource availability of the plurality of secondary data nodes.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements.

The number of elements of the first data structure and the number of elements of the second data structure may be the same or different.

In general, embodiments of the invention relate to systems, devices, and methods for dividing a large file or volume to be backed up into smaller segments and distributing the segments among data nodes on a cluster. The division of the large file or volume into smaller segments may be done intelligently (as discussed in more detail below). The distribution of the segments may be done dynamically by leveraging the resources (e.g., memory, processing resources, etc.) available on each data node on the cluster. As a result, the resources of the data nodes are load balanced, which results in the process of backing up the large file or volume (e.g., the backup window) advantageously becoming faster and more efficient compared to conventional file backup techniques.

Figure 1A:
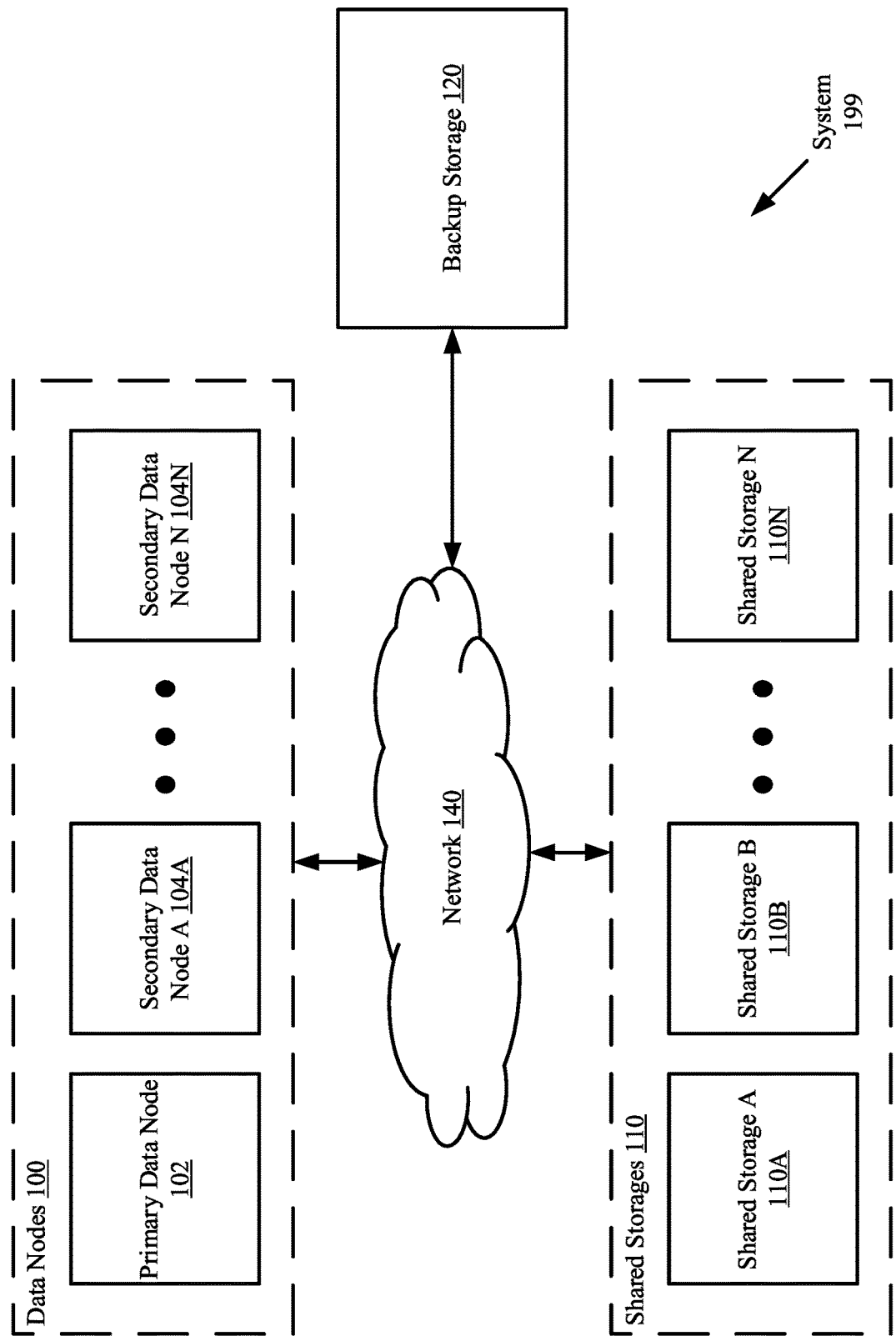
FIG. 1A shows a diagram of a system in accordance with one or more embodiments of the invention.

FIG. 1A shows a diagram of a system (199) in accordance with one or more embodiments of the invention. The system (199) may include data nodes (100), shared storages (110), a backup storage (120), and a network (140). The system (199) may include additional, fewer, and/or different components without departing from the invention. Each component may be operably connected to one another (or to additional components (not shown)) via any combination of wired and/or wireless connections. Each component of the system (199) is discussed below.

In one or more embodiments of the invention, the data nodes (100) may perform workloads and provide services to clients and/or other entities not shown in the system illustrated in FIG. 1A. During the performance of the aforementioned services, data may be generated or otherwise obtained. The data nodes may not include the resources to store the data, and therefore, obtain data storage services from the shared storage (110). The data storage services may include storing, modifying, obtaining, and/or deleting data stored on the shared storages (110). The data storage services may include other and/or additional services without departing from the invention. The data generated and stored on the shared storages (110) by the data nodes (100) may be valuable to users of the system, and therefore may be protected. The data nodes (100) may obtain backup storage services from the backup storage (120). The backup storage services may include storing backups of data stored on the shared storages for restoration purposes. The backup storage services may include other and/or additional services without departing from the invention. The data nodes (100) may also include the functionality to perform data protection services for data stored in the shared storages (110). More specifically, the data protection services may include generating backups of data stored in the shared storages (110) and storing the backups in the backup storage (110). The data nodes (100) may include the functionality to perform other and/or additional services without departing from the invention.

The data nodes (100) may include a primary data node (102) and secondary data nodes. The data nodes (100) may include any number of secondary data nodes without departing from the invention. The data nodes (100) may include secondary data node A (104A) and secondary data node N (104N). Each data node (102, 104A, 104N), may be operably connected to one or more shared storages (110) and may obtain data storage services from the one or more shared storages (110). For additional information regarding the primary data node (102), refer to FIG. 1B. For addition information regarding the secondary data nodes (e.g., 104A, 104N), refer to FIG. 1C.

Figure 4:
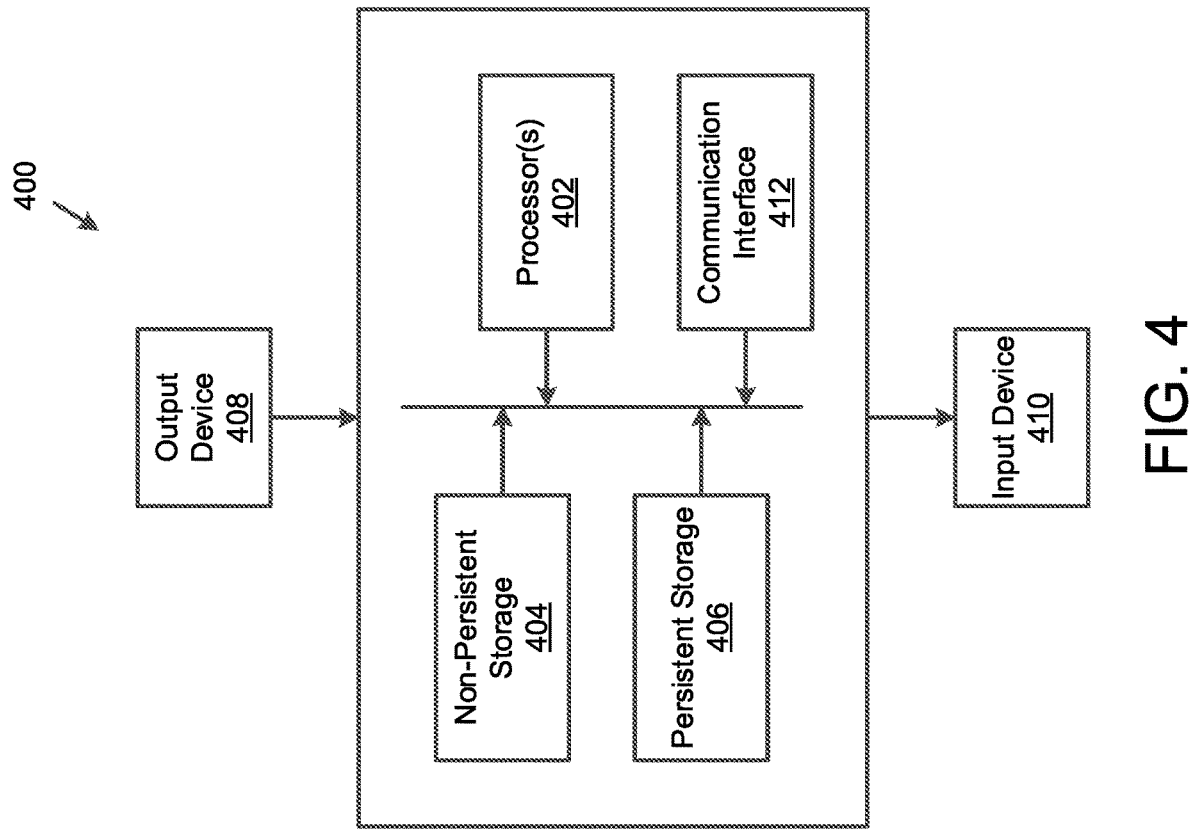
FIG. 4 shows a diagram of a computing device in accordance with one or more embodiments of the invention.

In one or more embodiments of the invention, the data nodes (100) may be implemented as computing devices (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the data nodes (100) described throughout this application.

In one or more embodiments of the invention, the data nodes (100) may be implemented as a logical device. The logical device may utilize the computing resources of any number of computing devices and thereby provide the functionality of the data nodes (100) described throughout this application.

In one or more embodiments of the invention, the shared storages (110) may provide data storage services to the data nodes (100). As discussed above, the data storage services may include storing, modifying, obtaining, and/or deleting data stored on the shared storages (110) based on instructions and/or data obtained from the data nodes (100). The data storage services may include other or additional services without departing from the invention. The shared storages (110) may include any number of shared storages without departing from the invention. The shared storages (110) may also include shared storage A (110A), shared storage B (110B), and shared storage N (110N). Each shared storage (110A, 110B, 110N) may provide data storage services to two or more data nodes (100). The shared storages (110) may include other or additional services without departing from the invention.

The shared storages (110) may include storage devices (not shown) for storing data. The storage devices may be physical storage devices or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the shared storages (110) may utilize portions of any combination of hard disk drives, solid state disk drives, tape drives, and/or any other physical storage medium of any number of computing devices.

In one or more embodiments of the invention, the shared storages (110) are implemented as computing devices (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the shared storages (110) described throughout this application.

In one or more embodiments of the invention, the shared storages (110) may be implemented as a logical device. The logical device may utilize the computing resources of any number of computing devices and thereby provide the functionality of the shared storages (110) described throughout this application.

In one or more embodiments of the invention, the backup storage (120) may include the functionality to provide backup storage services to the data nodes (100), as discussed above. The backup storage services may include: (i) obtaining backups of data generated through the performance of computer implemented services from the data nodes (100); (ii) storing data and metadata associated with the backups in persistent storage of the backup storage (120); and (iii) providing backups to the data nodes (100) for restoration purposes and/or other and/or additional purposes without departing from the invention. The backup storage services may also include the functionality to provide and/or obtain other and/or additional services without departing from the invention. The backup storage (120) may include any number of backup storages without departing from the invention.

In one or more embodiments of the invention, the backup storage (120) may be implemented as a computing device (see e.g., FIG. 4). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of a backup storage (120) described throughout this application.

In one or more embodiments of the invention, the backup storage (120) may be implemented as a logical device. The logical device may utilize the computing resources of any number of computing devices and thereby provide the functionality of the backup storage (120) described throughout this application.

In one or more embodiments of the invention, each component of the system discussed above may be operatively connected to any of the other components through the network (140). A network (e.g., network (140)) may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may also be located at a single physical location, or be distributed at any number of physical sites. In one or more embodiments disclosed herein, a network may be coupled with or overlap, at least in part, with the Internet.

In one or more embodiments, although not shown in FIG. 1, the network (140) may include any number of devices within any components (e.g., 100, 110, 120) of the system, as well as devices external to, or between, such components of the system. In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device may also include any number of additional components (not shown), such as, for example, network chips, field programmable gate arrays (FPGAs), application specific integrated circuits (ASICs), indicator lights (not shown), fans (not shown), etc. A network device may include any other components without departing from the invention. Examples of a network device include, but are not limited to, a network switch, a router, a multilayer switch, a fibre channel device, an InfiniBand® device, etc. A network device is not limited to the aforementioned specific examples and may include other components without departing from one or more embodiments disclosed herein.

In one or more embodiments, a network device may include functionality to receive network traffic data units (e.g., frames, packets, tunneling protocol frames, etc.) at any of the network interfaces (i.e., ports) of a network device and to process the network traffic data units. In one or more embodiments, processing a network traffic data unit may include, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing may include, but are not limited to, performing a lookup to determine (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices may be configured to participate in one or more network protocols, which may include discovery schemes by which a given network device may obtain information about all or any of the network topology in which the network device exists. Such discovery schemes may include sharing of information between network devices, and may also include providing information to other devices within the system, such as, for example, data nodes (100), backup storage (120) and/or shared storages (110).

Figure 1B:
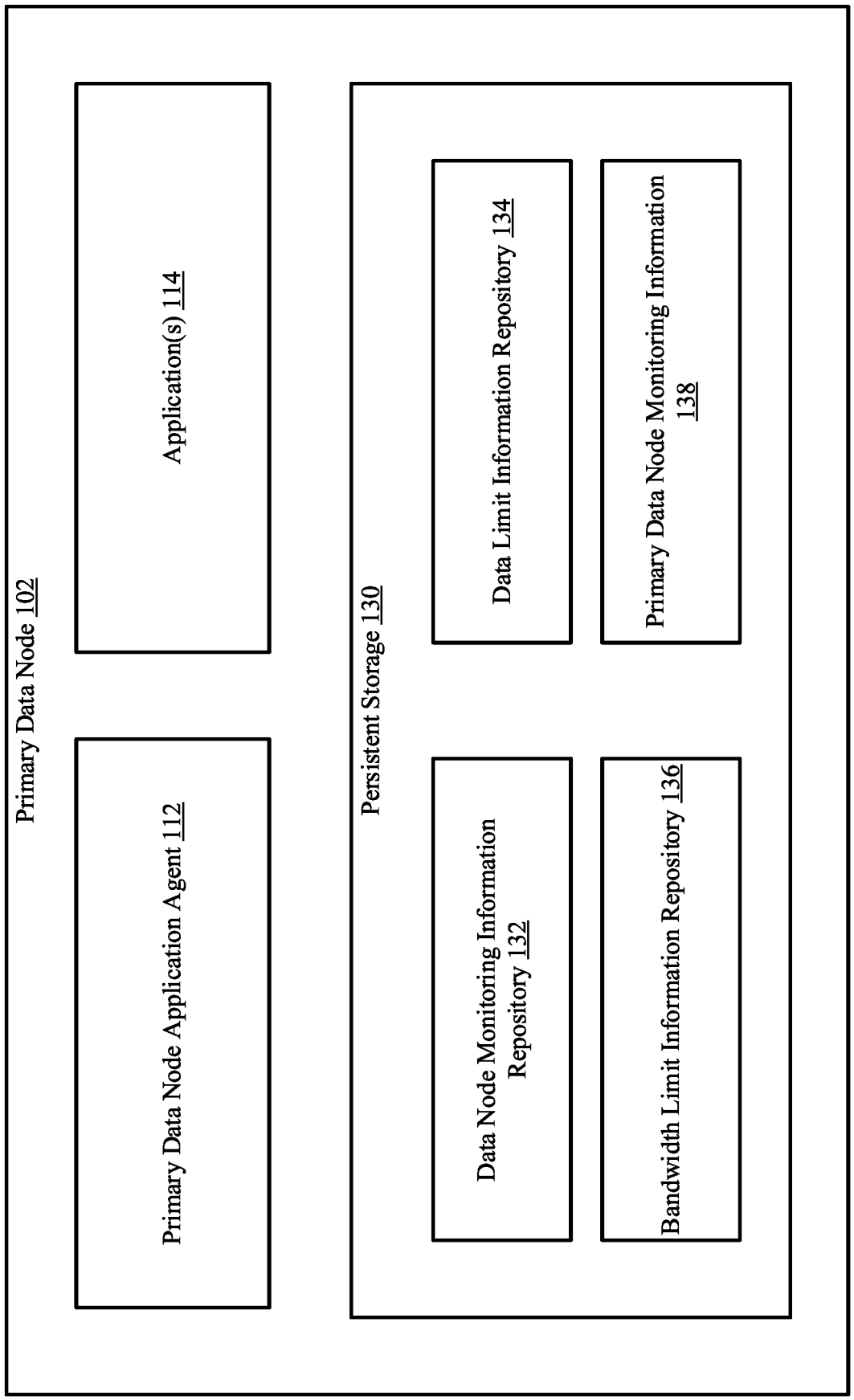
FIG. 1B shows a diagram of a primary data node in accordance with one or more embodiments of the invention.

FIG. 1B shows a diagram of a primary data node in accordance with one or more embodiments of the invention. The primary data node (102) may be an embodiment of the primary data node (102, FIG. 1A) discussed above. As discussed above, the primary data node (102) may provide services to clients and/or other entities not shown in the system illustrated in FIG. 1A and obtain backup storage services from the backup storage (120, FIG. 1A). Additionally, the primary data node (102) may also perform data protection services for data associated with the primary data node stored on shared storages (120, FIG. 1A). Furthermore, the primary data node (102) may also include the functionality to provide data protection management services for the data nodes (100, FIG. 1A). The primary data node (102) may provide and/or obtain other and/or additional services without departing from the invention. To provide the aforementioned functionality, the primary data node (102) may include a primary data node application agent (112), application(s) (114) and persistent storage (130). The primary data node (102) may include other and/or additional components without departing from the invention. Each of the aforementioned components is discussed below.

In one or more embodiments of the invention, the primary data node application agent (112) may include the functionality to perform data protection management services for the data nodes (100, FIG. 1A) as discussed above. The data protection management services may include: (i) identifying protection policy events initiating the performance of data protection services for data stored in shared storages (110, FIG. 1A); (ii) obtaining monitoring information (discussed below) associated with the primary data node (102) and the secondary data nodes (104A, 104N, FIG. 1A); (iii) assigning data limits (discussed below) to the primary data node (102) and the secondary data nodes (104A, 104N, FIG. 1A) based on the obtained monitoring information; (iv) assigning bandwidth limits (discussed below) to the primary data node (102) and the secondary data nodes (104A, 104N, FIG. 1A) based on the monitoring information and the assigned data limits; and (v) initiating the performance of data protection services by the primary data node (102) and the secondary data nodes (104A, 104N, FIG. 1A) based on the assigned data limits and bandwidth limits. The primary data node application agent may perform the data protection management services as discussed in FIGS. 3A-3B. The data protection management services may include other and/or additional services without departing from the invention.

In one or more embodiments of the invention, the primary data node application agent (112) may include the functionality to perform data protection services as discussed above. The data protection services may include: (i) generating backups of data stored in the shared storages (110, FIG. 1A) based on data limits and bandwidth limits assigned to the primary data node (102); (ii) storing the generated backups in the backup storage (120, FIG. 1A); and (iii) generating monitoring information associated with the primary data node (102). The data protection services may include other and/or additional services without departing from the invention.

In one or more embodiments of the invention, the primary data node application agent (112) may be a physical device including circuitry. The physical device may be, for example, a field-programmable gate array, application specific integrated circuit, programmable processor, microcontroller, digital signal processor, or other hardware processor. The physical device may be adapted to provide the functionality of the primary data node application agent (112) described throughout this application.

In one or more embodiments of the invention, the primary data node application agent (112) may be implemented as computer instructions, e.g., computer code, stored on a persistent storage that when executed by a processor of the primary data node (102) causes the primary data node (102) to provide the functionality of the primary data node application agent (112) described throughout this application.

In one or more embodiments of the invention, the primary data node (102) may host one or more applications (114). In one or more embodiments of the invention, the application(s) (114) perform computer implemented services for clients (not shown in FIG. 1A). Performing the computer implemented services may include performing workloads (e.g., data processing) that result in the generation of data that is stored in a shared storage of the shared storages (110). The computer implemented services may include other and/or additional services without departing from the invention. The application(s) (114) and/or users of the client(s) (100, FIG. 1A) may include functionality for performing the aforementioned workloads in the primary data node (102). The application(s) (114) may be, for example, instances of databases, email servers, and/or other applications. The primary data node (102) may host other types of applications without departing from the invention.

In one or more of embodiments of the invention, the application(s) (114) may be implemented as computer instructions, e.g., computer code, stored on a persistent storage (e.g., 130) that when executed by a processor(s) of the primary data node (102) cause the primary data node (102) to provide the functionality of the application(s) (114) described throughout this application.

In one or more embodiments of the invention, the persistent storage (130) may store data. The persistent storage (130) may include a data node monitoring information repository (132), a data limit information repository (134), a bandwidth limit information repository (136), and primary data node monitoring information (138). The persistent storage (130) may store other and/or additional data without departing from the invention. Each of the aforementioned types of data stored in the persistent storage (130) is discussed below.

The data node monitoring information repository (132) may be one or more data structures that include information regarding the access and/or usage of the shared storages (110, FIG. 1A) associated with each data node of the data nodes (100, FIG. 1A). The data node monitoring information may specify the data protection information associated with the shared storages (110, FIG. 1A) and the workload information associated with each of the shared storages (110, FIG. 1A) of each data node of the data nodes (100). The information included in the data node monitoring information repository (132) may be used by the primary data node application agent (112) to perform data protection management services as discussed in the methods illustrated in FIGS. 3A-3B. The data node monitoring information may be generated by the data nodes (100, FIG. 1A) and sent to the primary data node (102) periodically and/or in response to a request from the primary data node (102). The data node monitoring information repository (132) may include other and/or additional information without departing from the invention.

The data limit information repository (134) may include one or more data structures that may include data limit information associated with data nodes (100, FIG. 1A). In one or more embodiments, the data limit information may include a list of data limits that may specify a portion of a shared storage (e.g., 110A, FIG. 1A) to which a data node may be assigned to perform data protection services. The data limits may include: (i) a limit on the number of input and output operations (i.e., read operations and/or write operations); (ii) a limit on the quantity of data associated with the input and output operations; (iii) and/or a limit on the capacity or quantity of storage space of the shared storage (e.g., 110A, FIG. 1A) a data node (e.g., 104A, FIG. 1A) may use to perform data protection services. The data limits may include other and/or additional information regarding data nodes access to shared storages (120, FIG. 1A) associated with the performance of data protection services. Each data limit included in the list of data limits may be associated with a data node identifier, which may refer to a global, unique bit string that may be used to specify a particular data node. The data limit information of the data limit information repository (134) may be generated by the primary data node application agent (112) during the performance of data protection management services and may be used by data nodes (100) to perform data protection services. The data limit information repository (134) may include other and/or additional information without departing from the invention.

The bandwidth limit information repository (136) may include one or more data structures that may include bandwidth limit information associated with data nodes (100, FIG. 1A). More specifically, the bandwidth limit information may include a list of bandwidth limits that may specify a portion of network bandwidth associated with a shared storage (e.g., 110A, FIG. 1A) a data node may be assigned to perform data protection services. The bandwidth limits may include other and/or additional information regarding data nodes' network access to shared storages (120, FIG. 1A) associated with the performance of data protection services. Each bandwidth limit included in the list of bandwidth limits may be associated with a data node identifier, which may refer to a global, unique bit string that may be used to specify a particular data node. The bandwidth limit information of the bandwidth limit information repository (136) may be generated by the primary data node application agent (112) during the performance of data protection management services, and may be used by data nodes (100) to perform data protection services. The bandwidth limit information repository (136) may include other and/or additional information without departing from the invention.

The primary data node monitoring information (138) may include one or more data structures that include monitoring information associated with the primary data node (102). The primary data node monitoring information (138) may be generated by the primary data node application agent (112) during the performance of data protection services, and may be used to generate data limits and bandwidth limits associated with the primary data node (102). The primary data node monitoring information (138) may be a portion of the data node monitoring information included in the data node monitoring information repository (132) discussed above.

The persistent storage (130) may be implemented using physical storage devices and/or logical storage devices. The physical storage devices may include any combination of hard disk drives, solid state disk drives, tape drives, and/or any other physical storage mediums for the storage of data.

logical storage devices (e.g., virtualized storage) may utilize any quantity of hardware storage resources of any number of computing devices for storing data. For example, the persistent storage (130) may utilize portions of any combination of hard disk drives, solid state disk drives, tape drives, and/or any other physical storage medium of any number of computing devices.

Figure 1C:
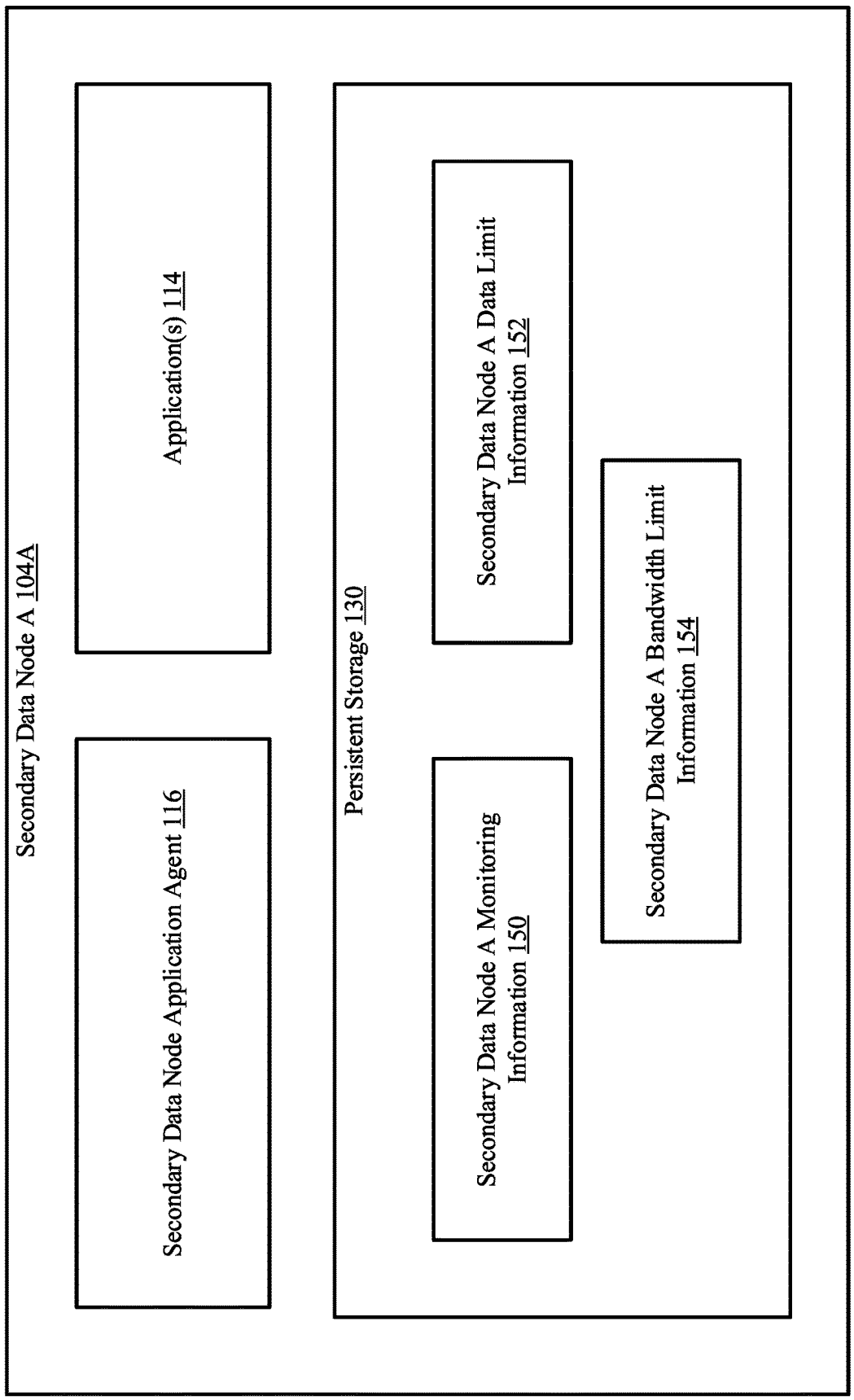
FIG. 1C shows a diagram of a secondary data node in accordance with one or more embodiments of the invention.

FIG. 1C shows a diagram of a secondary data node in accordance with one or more embodiments of the invention. The secondary data node A (104A) may be an embodiment of a secondary data node (e.g., 104A, FIG. 1A) discussed above. As discussed above, secondary data node A (104A) may provide services to clients and/or other entities not shown in the system illustrated in FIG. 1A and obtain backup storage services from the backup storage (120, FIG. 1A). Additionally, secondary data node A (104A) may also perform data protection services for data associated with the primary data node stored on shared storages (120, FIG. 1A). Secondary data node A (104A) may provide and/or obtain other and/or additional services without departing from the invention. To provide the aforementioned functionality, secondary data node A (104A) may include a secondary data node application agent (116), application(s) (114) and persistent storage (130). Secondary data node A (104A) may include other and/or additional components without departing from the invention. Each of the aforementioned components is discussed below.

In one or more embodiments of the invention, the secondary data node application agent (116) may include the functionality to perform data protection services as discussed above. The data protection services may include: (i) generating backups of data stored in the shared storages (110, FIG. 1A) based on data limits and bandwidth limits assigned to secondary data node A (104A) and obtained from primary data node (102, FIG. 1A); (ii) storing the generated backups in the backup storage (120, FIG. 1A); and (iii) generating monitoring information associated with secondary data node A (104A) and providing the monitoring information to the primary data node (102, FIG. 1A). The data protection services may include other and/or additional services without departing from the invention.

In one or more embodiments of the invention, the secondary data node application agent (116) may be a physical device including circuitry. The physical device may be, for example, a field-programmable gate array, application specific integrated circuit, programmable processor, microcontroller, digital signal processor, or other hardware processor. The physical device may be adapted to provide the functionality of the secondary data node application agent (116) described throughout this application.

In one or more embodiments of the invention, the secondary data node application agent (116) may be implemented as computer instructions, e.g., computer code, stored on a persistent storage that when executed by a processor of secondary data node A (104A) causes secondary data node A (104A) to provide the functionality of the secondary data node application agent (116) described throughout this application.

In one or more embodiments of the invention, secondary data node A (104A) may host one or more applications (114). The application(s) (114) may be an embodiment of the application(s) (114, FIG. 1B) discussed above. For additional information regarding the application(s) (114), refer to FIG. 1B.

In one or more embodiments of the invention, the persistent storage (130) may store data. The persistent storage (130) may be an embodiment of the persistent storage (130, FIG. 1B) discussed above. For additional information regarding the persistent storage, refer to FIG. 1B.

The persistent storage (130) may include secondary data node A monitoring information (150), secondary data node A data limit information (152), and secondary data node A bandwidth limit information (154). The persistent storage may store other and/or additional information without departing from the invention. Each of the aforementioned types of information stored in the persistent storage is discussed below.

Secondary data node A monitoring information (150) may include one or more data structures that include monitoring information associated with secondary data node A (104A). Secondary data node A monitoring information (150) may be generated by the primary data node application agent (112) during the performance of data protection services and may be used to generate data limits and bandwidth limits associated with secondary data node A (104A). The secondary data node A monitoring information (150) may be a portion of the data node monitoring information included in the data node monitoring information repository (132) discussed above.

Secondary data node A data limit information (152) may include one or more data structures that may include data limit information associated with secondary data node A (104A). The data limit information may include a list of data limits. In one or more embodiments of the invention, the data limits specify a portion of a shared storages (e.g., 110A, FIG. 1A) secondary data node A (104A) may be assigned to perform data protection services. The data limits may include: (i) a limit on the number of input and output operations (i.e., read operations and/or write operations); (ii) a limit on the quantity of data associated with the input and output operations; and/or (iii) a limit on the capacity or quantity of storage space of the shared storage (e.g., 110A, FIG. 1A) secondary data node A (104A) may use to perform data protection services. Each data limit included in the list of data limits may be associated with a shared storage identifier, which may refer to a global, unique bit string that may be used to specify a particular shared storage of the shared storages (120, FIG. 1A). The data limits may include other and/or additional information regarding secondary data node A's (104A) access to shared storages (120, FIG. 1A) associated with the performance of data protection services. The secondary data node A data limit information (152) may be generated by the primary data node application agent (112) during the performance of data protection management services and may be used by the secondary data node application agent (116) to perform data protection services. The secondary data node A data limit information (104A) may include other and/or additional information without departing from the invention.

The secondary data node A bandwidth limit information (154) may include one or more data structures that may include bandwidth limit information associated with secondary data node A (104A). The secondary data node A bandwidth limit information (154) may include a list of bandwidth limits that specifies a portion of network bandwidth associated with a shared storage (e.g., 110A, FIG. 1A) a data node may be assigned to perform data protection services. The bandwidth limits may include other and/or additional information regarding secondary data node A (104A) network access to shared storages (120, FIG. 1A) associated with the performance of data protection services. Each bandwidth limit included in the list of bandwidth limits may be associated with a shared storage identifier, which may refer to a global, unique bit string that may be used to specify a particular shared storage of the shared storages (120, FIG. 1A). The secondary data node A bandwidth limit information (154) may be generated by the primary data node application agent (112) during the performance of data protection management services, and may be used by the secondary data node application agent (116) to perform data protection services. The secondary data node A bandwidth limit information (154) may include other and/or additional information without departing from the invention.

Figure 2A:
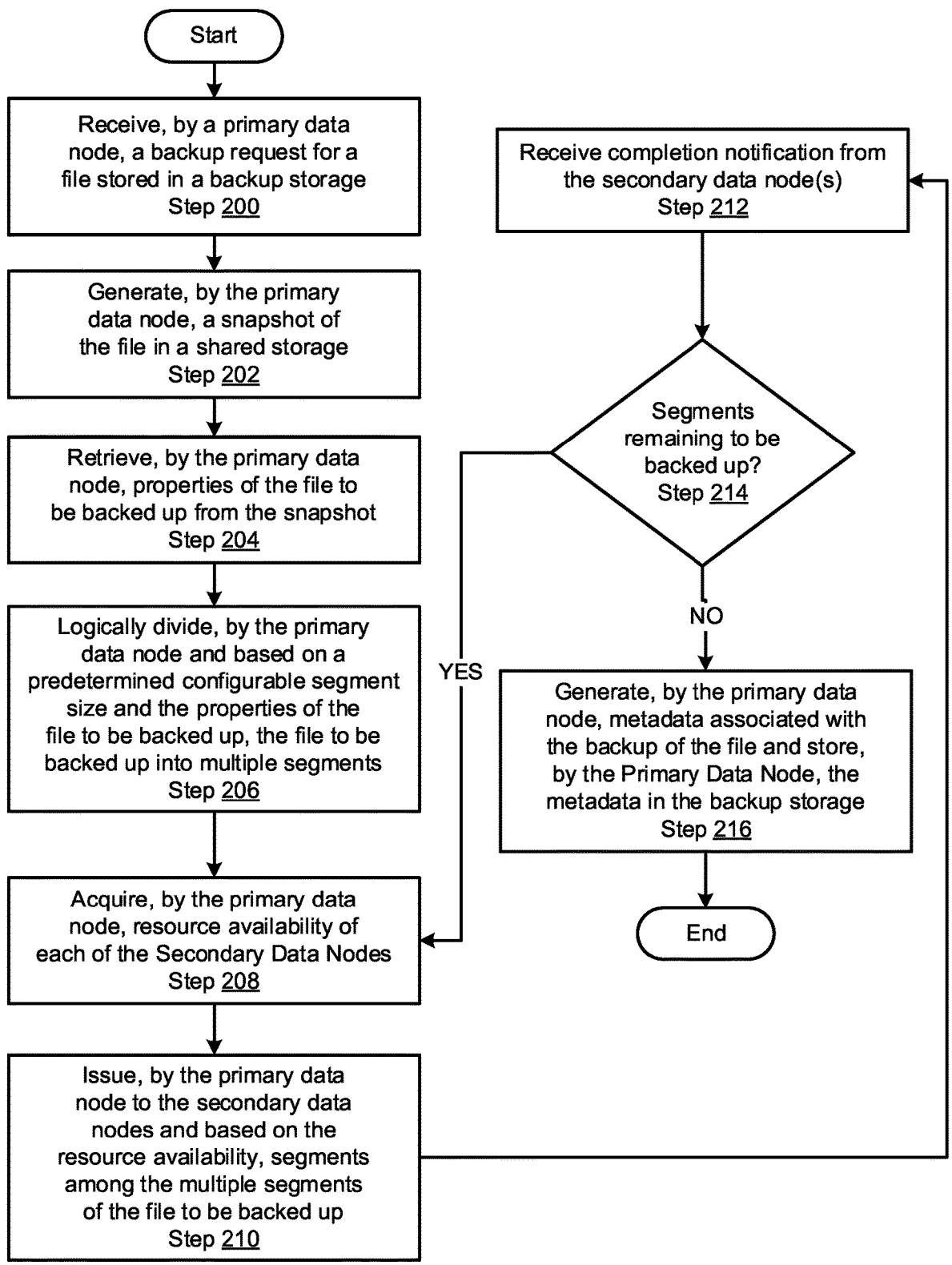
FIG. 2A shows a flowchart of a method of performing backup of a file by the Primary Data Node in accordance with one or more embodiments of the invention.

FIG. 2A shows a flowchart of a method of performing backup of a file by the primary data node in accordance with one or more embodiments of the invention. The method may be performed by, for example, a primary data node application agent (112, FIG. 1B) of a primary data node (102, FIG. 1A). Other components of the system illustrated in FIG. 1A may perform all, or a portion of the method of FIG. 2A without departing from the invention.

While FIG. 2A is illustrated as a series of steps, any of the steps may be omitted, performed in a different order, additional steps may be included, and/or any or all of the steps may be performed in a parallel or overlapping manner without departing from the invention.

In Step 200, backup storage sends a backup request to a primary data node.

In one or more embodiments of the invention, a backup request may be sent from the backup storage (e.g., 120, FIG. 1A) to the primary data node (e.g., 102, FIG. 1A) to request backup of a file or volume that is currently stored in the shared storages (e.g., 110, FIG. 1A into the backup storage. In one or more embodiments, the backup request may be initiated in real-time by a client device (e.g., a computer, a laptop computer, a touchpad, etc.) connected to the network (e.g., 140, FIG. 1A). Alternatively, the backup request may be a backup request that has been pre-scheduled.

In Step 202, the primary data node generates a snapshot of the file or volume in the shared storage.

In one or more embodiments of the invention, the primary data node (e.g., using the primary data node application agent (e.g., 102, FIG. 1B)) generates a snapshot of the file or volume identified within the backup request (herein referred to as the "file or volume to be backed up"). The snapshot may then be stored in the same shared storage containing the file or volume. In one or more embodiments, the snapshot may reflect the data stored in the file or volume at a particular point in time. More specifically, the snapshot may be used to generate a backup of the file or volume by either: (i) including data that is representative of the state of the file or volume at the point in time the is being generated (e.g., data that reflects a most current state of file or volume); or (ii) including data that is representative of the difference between the state of the file or volume at the point in time the snapshot is being generated (e.g., a first point in time) and a second state of the file or volume at a second point in time prior to the first point in time (e.g., data that reflects a change in the state of the file or volume).

In Step 204, the primary data node (e.g., using the primary data node application agent) retrieves the properties of the file or volume to be backed up from the snapshot.

In one or more embodiments of the invention, the primary data node may retrieve the properties of the file or volume that needs to be backed up from the snapshot generated in Step 202. The properties of the file or volume may include, but not limited to: the size of the file or volume, a format of the file or volume, a creation date of the file or volume, etc.

In Step 206, the primary data node logically divides the file or volume to be backed up (or the snapshot of the file or volume to be backed up) into multiple segments, according to a pre-determined configurable segment size.

In one or more embodiments of the invention, the primary data node may read the predetermined configurable segment size, i.e., unit of data to be allocated to a secondary data node (e.g., 104A-104N, FIGS. 1A and 1C) for backup, from a configuration store (also referred to herein as "config store") (e.g., a config store of [inventors, please provide examples of where the config store may come from]). As a non-limiting example, in one or more embodiments, the pre-determined configurable segment size may be 50 GB. In this example, the primary data node may then logically divide the file or volume (herein after may be simply referred to as a "file") (or the snapshot of the file or volume to be backed up) to be backed up into multiple segments each having the pre-determined configurable segment size of 50 GB.

In Step 208, the primary data node acquires resource availability of the secondary data nodes.

In one or more embodiments of the invention, the primary data node may query a list of all of the secondary data nodes along to retrieve (i.e., acquire) information associated with available resources (e.g., computer processing unit (CPU) usage, memory usage, etc.) of each of the secondary data nodes.

In Step 210, based on their available resources, the primary data node issues to each secondary data node a finite number of segments to back up.

In one or more embodiments of the invention, after acquiring information associated with the available resources (also referred to herein as "resource availability") of each of the secondary data nodes and based on this information, the primary data node may allocate one or more of the divided segments (see Step 206) to one or more of the secondary data nodes. Secondary data nodes allocated with one or more of the divided segments may then instantiate a backup process of the allocated divided segments.

In Step 212, the primary data node receives completion notification from the secondary data node(s).

In one or more embodiments of the invention, after a secondary data node completes the backup process of its assigned (i.e., allocated) segment(s), the secondary data node may transmit a completion notification to the primary data node. The completion notification may notify the primary data node of the following information: (i) information (e.g., an identification (ID), a name, a serial number, etc.) of the secondary data node that transmitted the completion notification; (ii) number of the segments for which backup has been completed; and (iii) location information specifying where the backed up segment(s) is stored.

In Step 214, the primary data node inspects (e.g., monitors) whether any segments to be backed up remain.

In one or more embodiments of the invention, after receiving a completion notification, the primary data node determines whether any segments have not yet been assigned to any secondary data node (i.e., whether any segments still needed to be backed up by the secondary data nodes. In the event there are segments that still need to be backed up by secondary data nodes, the primary data node allocates (e.g., based on knowing the available resources of each of the secondary data nodes) a portion (or all) of the segments that still need to be backed up to the secondary data node(s) that have transmitted a completion notification to the primary data node.

In Step 216, if the primary data node determines that there no more segments that still need to be backed up in Step 214, the primary data node generates metadata and stores the metadata in the backup storage.

In one or more embodiments of the invention, the metadata may include a portion (or all) information specified in each completion notification received by the Master Data Node from the secondary data nodes. As one non-imitating example, in one or more embodiments, the primary data node may generate the metadata in response to receiving a very first completion notification from one of the secondary data nodes and store the generated metadata in the backup storage. The primary data node may then update this metadata in the backup storage each time a subsequent completion notification is received from the secondary data nodes.

In one or more embodiments, the method may end following step 216 (e.g., once step 216 is completed.

In one or more embodiments, at any point in time between above-discussed Steps 208 and 216, the primary data node may be constantly acquiring (see Step 208) information associated with the available resources of each of the secondary data nodes. This acquisition by the primary data node may be done at any predetermined period set by a user (e.g., an administrator of the primary data node). Consequently, as a result of the constant acquisition of the information, the primary data node is provided with an up-to-date understanding of the condition of each of the secondary data nodes. This advantageously allows the primary data node to more efficiently allocate any segments that still need to be backed up by the secondary data nodes.

Figure 2B:
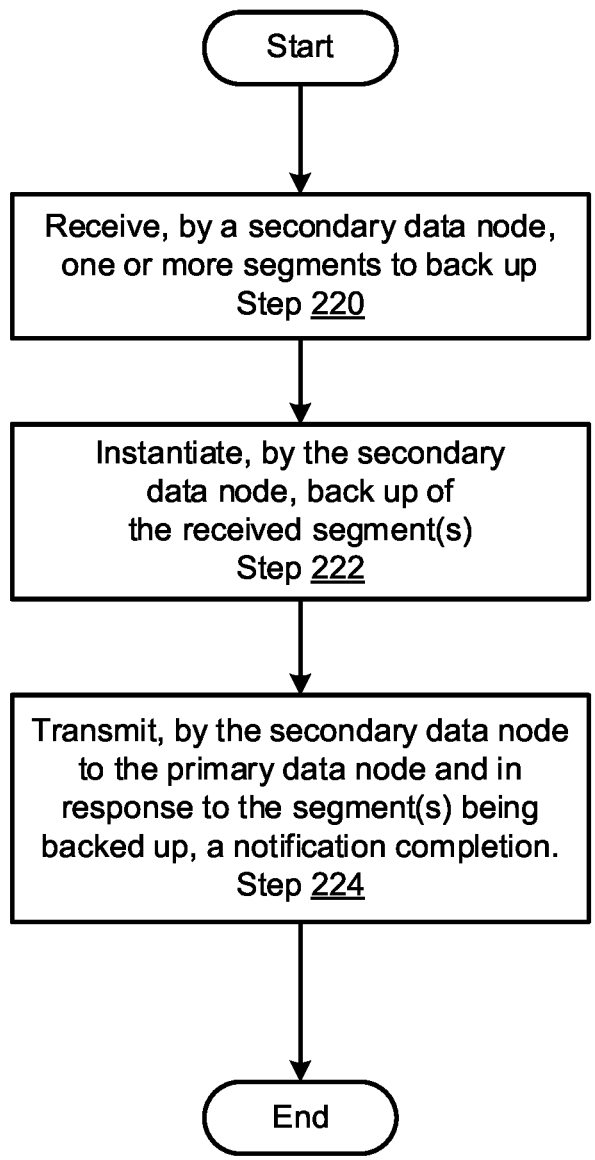
FIG. 2B shows a flowchart of a method of performing backup of a file by the Secondary Data Node in accordance with one or more embodiments of the invention.

FIG. 2B shows a flowchart of a method for performing data protection services in accordance with one or more embodiments of the invention. The method may be performed by, for example, a secondary data node application agent (e.g., 116, FIG. 1C) of a secondary data node (e.g., 104A, FIG. 1A). Other components of the system illustrated in FIG. 1A may perform all, or a portion of the method of FIG. 2B without departing from the invention.

While FIG. 2B is illustrated as a series of steps, any of the steps may be omitted, performed in a different order, additional steps may be included, and/or any or all of the steps may be performed in a parallel and/or overlapping manner without departing from the invention.

In Step 220, a secondary data node receives one or more segments to backup. In one or more embodiments of the invention, the secondary data node may receive the segment(s) from the primary data node in response to Step 210 discussed above in FIG. 2A In Step 222, the secondary data node backs up the segment(s) received (i.e., allocated) from the primary data node.

In one or more embodiments of the invention, the backup of the segment(s) may be instantiated by the secondary data node application agent (e.g., 116, 1C) of the secondary data node. The secondary data node application agent may store the backup of the segment(s) in the backup storage. The backup process instantiated by the secondary data node may be independent of those instantiated by other ones of the secondary data nodes. Consequently, the secondary data node may advantageously perform the backup of the segment(s) without being impacted (e.g., in a negative manner) by the performance and/or conditions of the other secondary nodes.

In Step 224, the secondary data node notifies the primary data node (e.g., using the above-discussed completion notification) that the segment(s) has been successfully backed up. In one or more embodiments, the completion notification may be transmitted in response to the completion of the backup of the segment(s).

The method may end following step 224.

Figure 3:
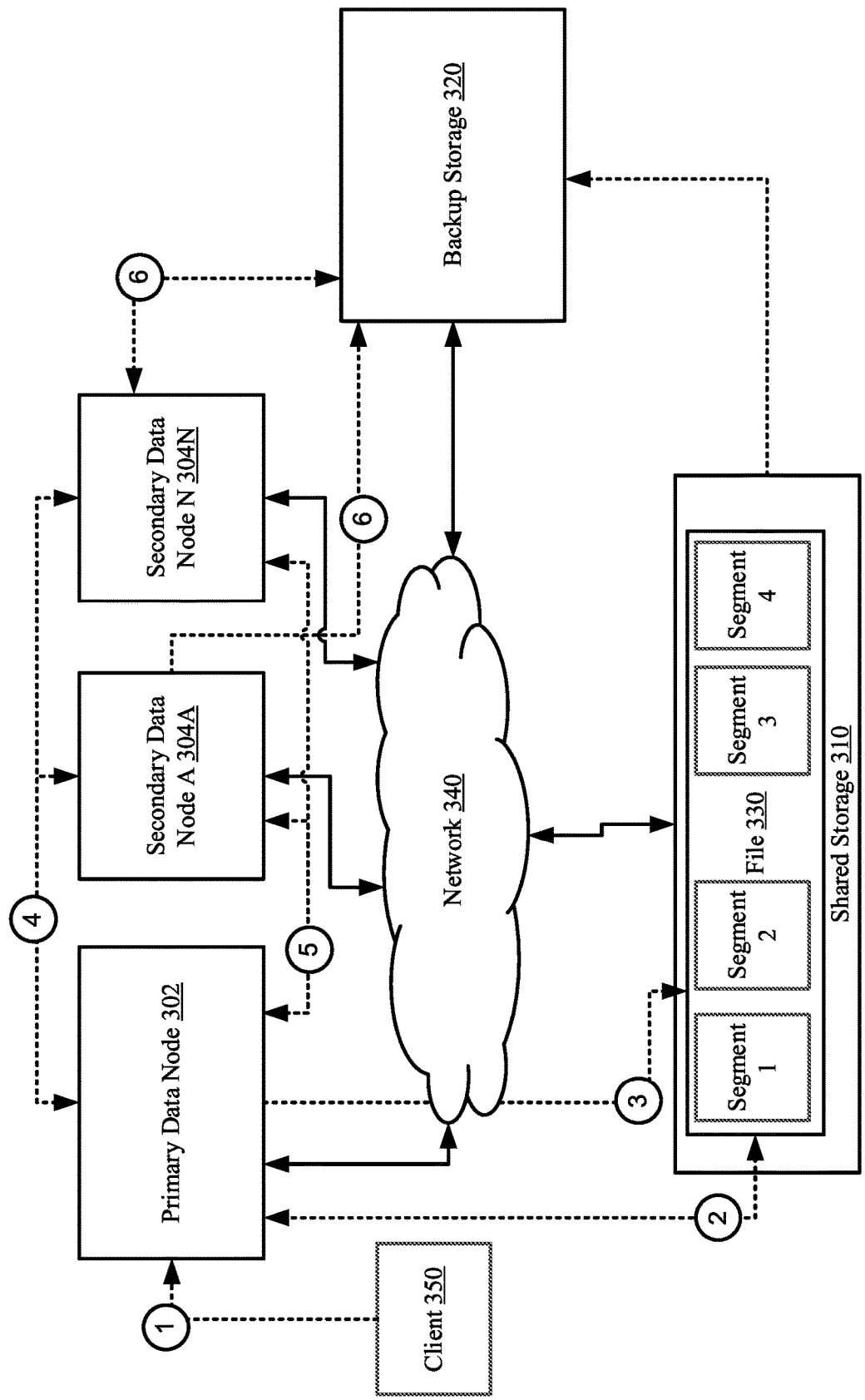
FIG. 3 shows an example in accordance with one or more embodiments of the invention.

To further clarify embodiments of the invention, a non-limiting example is provided in FIG. 3. FIG. 3 shows a diagram of operations performed by an example system over time in accordance with one or more embodiments of the invention. FIG. 3 may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIG. 3.

Example

Turning to FIG. 3, consider a scenario in which a primary data node (302), two secondary data nodes (secondary data node A (104A) and secondary data node N (304N)), and a client (350) are operably connected to a shared storage (310) and a backup storage (320) through a network (340). Initially, the client (350) sends a backup request to the primary data node (302) to back up a file (330) currently located in the shared storage (310) onto the backup storage (320) [1].

In response to receiving the backup request, the primary data node (302) generates a snapshot of the file (330) on the shared storage (310) and retrieves properties of the file (330) from the generated snapshot [2]. Using the retrieved properties and based on a predetermined configurable segment size, the primary data node (302) divides the snapshot into segments (e.g., segments 1-4).

The primary data node (302) acquires resource availabilities of each of the secondary data nodes (secondary data node A (104A) and secondary data node N (304N) [4]. Based on the acquired resource availabilities, the primary data node (302) allocates one or more of the segments (e.g., segments 1-4) to each of the secondary data nodes (secondary data node A (104A) and secondary data node N (304N) [5]. For example, in [5], segment 1 may be allocated to secondary data node A (104A) and segments 2 and 3 may be allocated to secondary data node N (304N).

As further part of [5], secondary data node N (304N) completes the backup of the segments 2 and 3 before secondary data node A (304A) has completed backup of segment 1. Consequently, upon completing backup of segments 2 and 3, secondary data node N (304N) transmits a completion notification to the primary data node (302). Upon receipt of the completion notification from secondary data node N (304N), the primary data node (302) transmits remaining segment 4 to secondary data node N (304N) to be backed up.

Additionally, in response to receiving a completion notification the primary data node (302) generates metadata including information included in the completion notification and stored the metadata in the backup storage (320).

Whenever any one of the secondary data nodes (secondary data node A (104A) and secondary data node N (304N) completes back up of one or more segments, the secondary data nodes (secondary data node A (104A) and secondary data node N (304N) store the backup of the segments into the backup storage [6].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the computing device. Further, such instructions may correspond to computer readable instructions that are stored on one or more non-transitory computer readable mediums.

The above-discussed advantages may directly improve the operations of a computer. In particular, embodiments of the invention may prevent and/or avoid the inefficient use of computing resources (e.g., of the shared storages) to store and backup data.

Any problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for performing data backup, the method comprising:
receiving a backup request specifying a file, wherein the file is stored in a shared storage;
in response to the backup request:
retrieving, by a primary data node, properties of the file;
determining, by the primary data node, resource availability for plurality of secondary data nodes, wherein the primary data node and the plurality of secondary data nodes are operatively connected to the shared storage and a backup storage;
logically dividing, by the primary data node, the file into a plurality of segments using at least the properties of the file; and
coordinating, by the primary data node, the backup of the file using the plurality of segments and the resource availability of the plurality of secondary data nodes,
wherein coordinating the backup of the file using the plurality of segments and the resource availability of the plurality of secondary data nodes comprises:
allocating a first set of segments from the plurality of segments to a first secondary data node of the plurality of secondary data nodes;
allocating a second set of segments from the plurality of segments to a second secondary data node of the plurality of secondary data nodes;
receiving, by the primary data node, a first completion notification from the first secondary data node and a second completion notification from the second secondary data node;
generate, in response to receiving the first completion notification and the second completion notification, aggregated metadata specifying storage locations of all the plurality of segments in the backup storage; and
sending, by the primary data node, the aggregated metadata to the backup storage,
wherein the first secondary data node backs up the first set of segments,
wherein the second secondary data node backs up the second set of segments, and
wherein the file comprises the first set of segments and the second set of segments.

2. The method of claim 1, further comprising, in response to the backup request:
   obtaining a snapshot comprising the file,
   wherein the snapshot is stored on the shared storage,
   wherein the snapshot is accessible to the primary data node and the plurality of secondary nodes, and
   wherein the snapshot is used by plurality of secondary data nodes to back up the file.

3. The method of claim 1, wherein logically dividing the file into the plurality of segments comprises:
   obtaining a predetermined segment size; and
   logically dividing the file based on the predetermined segment size.

4. The method of claim 1, wherein the first completion notification comprises first metadata specifying first storage locations of the first set of segments in the backup storage and wherein the second completion notification comprises second metadata specifying second storage locations of the second set of segments in the backup storage.

5. A production host for hosting virtual machines, comprising:
   a persistent storage storing:
      a data node monitoring information repository;
      a data limit information repository;
      a bandwidth limit information repository; and
      a primary data node monitoring information;
   an application agent programmed to:
      receive a backup request specifying a file, wherein the file is stored in a shared storage; and
      in response to the backup request:
         retrieve, by a primary data node, properties of the file;
         determine, by the primary data node, resource availability for plurality of secondary data nodes, wherein the primary data node and the plurality of secondary data nodes is operatively connected to the shared storage and a backup storage;
         logically divide, by the primary data node, the file into a plurality of segments using at least the properties of the file; and
         coordinate, by the primary data node, the backup of the file using the plurality of segments and the resource availability of the plurality of secondary data nodes,
         wherein coordinating the backup of the file using the plurality of segments and the resource availability of the plurality of secondary data nodes comprises:
            allocating a first set of segments from the plurality of segments to a first secondary data node of the plurality of secondary data nodes;
            allocating a second set of segments from the plurality of segments to a second secondary data node of the plurality of secondary data nodes;
            receiving, by the primary data node, a first completion notification from the first secondary data node and a second completion notification from the second secondary data node;
            generate, in response to receiving the first completion notification and the second completion notification, aggregated metadata specifying storage locations of all the plurality of segments in the backup storage; and
            sending, by the primary data node, the aggregated metadata to the backup storage,
         wherein the first secondary data node backs up the first set of segments,
         wherein the second secondary data node backs up the second set of segments, and
         wherein the file comprises the first set of segments and the second set of segments.

6. The production host of claim 5, wherein the application agent is further programmed to, in response to the backup request:
   obtain a snapshot comprising the file,
   wherein the snapshot is stored on the shared storage,
   wherein the snapshot is accessible to the primary data node and the plurality of secondary nodes, and
   wherein the snapshot is used by plurality of secondary data nodes to back up the file.

7. The production host of claim 5, wherein logically dividing the file into the plurality of segments comprises:
   obtaining a predetermined segment size; and
   logically dividing the file based on the predetermined segment size.

8. A non-transitory computer readable medium (CRM) comprising computer readable program code, which when executed by a computer processor enables the computer processor to perform a method for hosting virtual machines, the method comprising:
   receiving a backup request specifying a file, wherein the file is stored in a shared storage; and
   in response to the backup request:
      retrieving, by a primary data node, the properties of the file from a snapshot;
      determining, by the primary data node, querying resource availability for a plurality of a secondary data nodes, by the primary data node, wherein the primary data node and the plurality of secondary data nodes is operatively connected to the shared storage and a backup storage;
      logically dividing, by the primary data node, the file into a plurality of segments, by the primary data node using at least the properties of the file;
      coordinating, by the primary data node, the backup of the file using the plurality of segments and the resource availability of the plurality of secondary data nodes, wherein coordinating the backup of the file using the plurality of segments and the resource availability of the plurality of secondary data nodes comprises:
         allocating a first set of segments from the plurality of segments to a first secondary data node of the plurality of secondary data nodes;
         allocating a second set of segments from the plurality of segments to a second secondary data node of the plurality of secondary data nodes;
         receiving, by the primary data node, a first completion notification from the first secondary data node and a second completion notification from the second secondary data node;
         generate, in response to receiving the first completion notification and the second completion notification, aggregated metadata specifying storage locations of all the plurality of segments in the backup storage; and
         sending, by the primary data node, the aggregated metadata to the backup storage,
      wherein the first secondary data node backs up the first set of segments,
      wherein the second secondary data node backs up the second set of segments, and wherein the file comprises the first set of segments and the second set of segments.

9. The CRM of claim 8, the method further comprising, in response to the backup request:
   obtaining a snapshot comprising the file,
   wherein the snapshot is stored on the shared storage,
   wherein the snapshot is accessible to the primary data node and the plurality of secondary nodes, and
   wherein the snapshot is used by plurality of secondary data nodes to back up the file.

10. The CRM of claim 8, wherein logically dividing the file into the plurality of segments comprises:
    obtaining a predetermined segment size; and
    logically dividing the file based on the predetermined segment size.

* * * * *